(12) United States Patent
Inoue et al.

(10) Patent No.: US 10,793,036 B2
(45) Date of Patent: Oct. 6, 2020

(54) VEHICLE SEAT

(71) Applicant: TOYOTA BOSHOKU KABUSHIKI KAISHA, Aichi-ken (JP)

(72) Inventors: Takuya Inoue, Aichi-ken (JP); Kazunobu Nuno, Toyama-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/282,975

(22) Filed: Feb. 22, 2019

(65) Prior Publication Data
US 2019/0263303 A1    Aug. 29, 2019

(30) Foreign Application Priority Data

Feb. 23, 2018  (JP) .................................. 2018-031075
Feb. 23, 2018  (JP) .................................. 2018-031077

(51) Int. Cl.
*B60N 2/68*   (2006.01)
*B60N 2/72*   (2006.01)

(52) U.S. Cl.
CPC .............. *B60N 2/682* (2013.01); *B60N 2/72* (2013.01)

(58) Field of Classification Search
CPC .......... B60N 2/68; B60N 2/682; B60N 2/686; B60N 2/72; B60N 2/64; B60N 2/643; B60N 2/70; B60N 2/646; B60N 2002/684
USPC ...................................... 297/452.18, 452.15
See application file for complete search history.

(56) References Cited

U.S. PATENT DOCUMENTS

| | | | | |
|---|---|---|---|---|
| 4,901,421 A | * | 2/1990 | Takarabe | B60N 2/071 248/430 |
| 5,100,204 A | * | 3/1992 | Makihara | B29C 49/20 264/516 |
| 8,196,888 B2 | * | 6/2012 | Yamada | B60N 2/0705 248/423 |
| 8,398,141 B2 | * | 3/2013 | Parker | B60N 2/0705 296/64 |
| 2009/0102224 A1 | * | 4/2009 | Rohee | B60N 2/0155 296/65.14 |

FOREIGN PATENT DOCUMENTS

JP    2015-3645    1/2015

* cited by examiner

*Primary Examiner* — Kyle J. Walraed-Sullivan
(74) *Attorney, Agent, or Firm* — Greenblum & Bernstein, P.L.C.

(57) ABSTRACT

A vehicle seat includes a seat cushion, a seat back and a seat frame. The seat frame has a first member provided with a first engaging pawl and a first pressing surface, a second member provided with a second engaging pawl and a second pressing surface, and a third member provided with a first concave portion and a second concave portion. The first engaging pawl is disposed on an inner side of the first concave portion, the second engaging pawl is disposed on an inner side of the second concave portion, and at least a portion of the first pressing surface and at least a portion of the second pressing surface press each other, causing the first engaging pawl to engage with the first concave portion, and the second engaging pawl to engage with the second concave portion.

10 Claims, 11 Drawing Sheets

VEHICLE SEAT

This nonprovisional application is based on Japanese Patent Application Nos. 2018-031075 and 2018-031077, both filed on Feb. 23, 2018, with the Japan Patent Office, the entire contents of which are hereby incorporated by reference.

BACKGROUND OF THE INVENTION

Field of the Invention

The present disclosure relates to a vehicle seat.

Description of the Background Art

A vehicle seat has a seat frame provided therein, which constitutes the framework of the vehicle seat. The seat frame has a back frame disposed within a seat back, and a cushion frame disposed within a seat cushion. In connection with assembling various members constituting a seat frame, a technique of joining a plurality of members together by welding is known, as disclosed in Japanese Patent Laying-Open No. 2015-003645.

SUMMARY OF THE INVENTION

When various members constituting a seat frame are to be joined together by welding, it is difficult to improve the productivity in a step of joining the members together. A separate facility for the welding is needed, as well as a processing cost for the welding. It is preferable that various members constituting a seat frame can be joined together without using a welding process.

An object of the present specification is to disclose a vehicle seat having a configuration that allows various members constituting a seat frame to be joined together without using a welding process.

A vehicle seat based on the present disclosure includes: a seat cushion and a seat back; and a seat frame constituting a framework of the seat cushion and the seat back, the seat frame having a first member provided with a first engaging pawl and a first pressing surface, a second member provided with a second engaging pawl and a second pressing surface, and a third member provided with a first concave portion and a second concave portion, in which the first engaging pawl is disposed on an inner side of the first concave portion, the second engaging pawl is disposed on an inner side of the second concave portion, and at least a portion of the first pressing surface and at least a portion of the second pressing surface press each other, causing the first engaging pawl to engage with the first concave portion, and the second engaging pawl to engage with the second concave portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments are described below with reference to the drawings. The same and corresponding components are designated by the same reference numbers and redundant description may not be repeated.

First Embodiment

A vehicle seat 100 in a first embodiment is described below with reference to FIGS. 1 to 6.

[Vehicle Seat 100]

Figure 1:
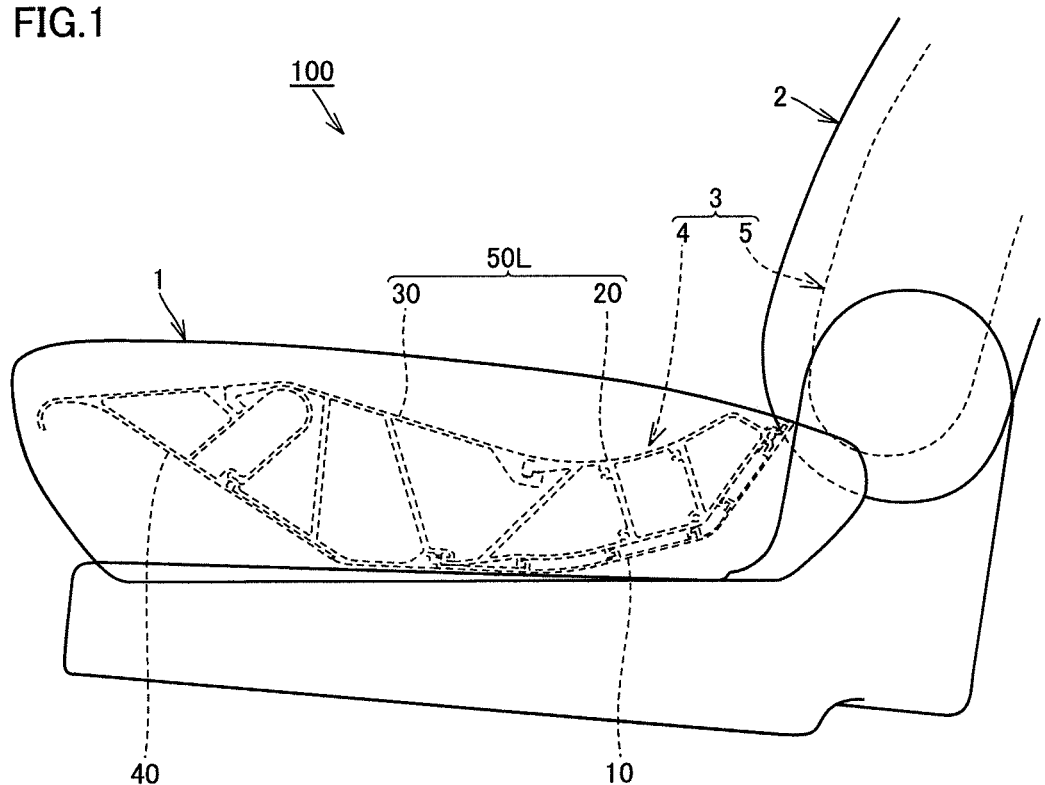
FIG. 1 is a side view showing a general configuration of a vehicle seat 100 in a first embodiment.

FIG. 1 is a side view showing a general configuration of vehicle seat 100. Vehicle seat 100 includes a seat cushion 1 and a seat back 2, and is utilized, for example, as a backseat of an automobile. A seat frame 3 is provided within vehicle seat 100. Seat frame 3 constitutes the framework of seat cushion 1 and seat back 2. Seat frame 3 of the present embodiment has a cushion frame 4 disposed within seat cushion 1, and a back frame 5 disposed within seat back 2.

[Cushion Frame 4]

Figure 2:
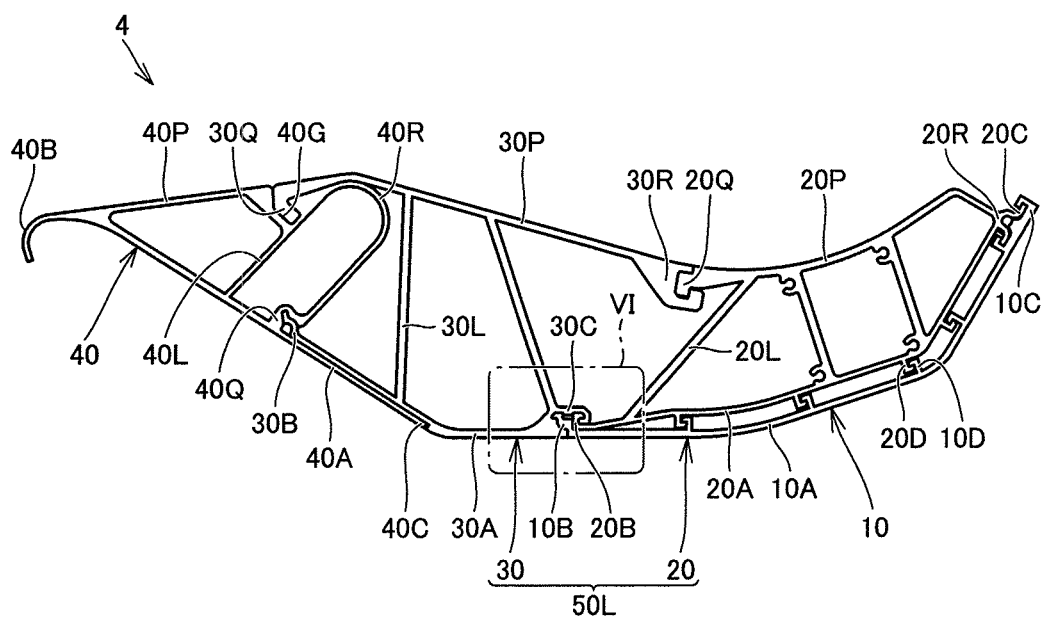
FIG. 2 is a side view showing a cushion frame 4 in the first embodiment.
Figure 3:
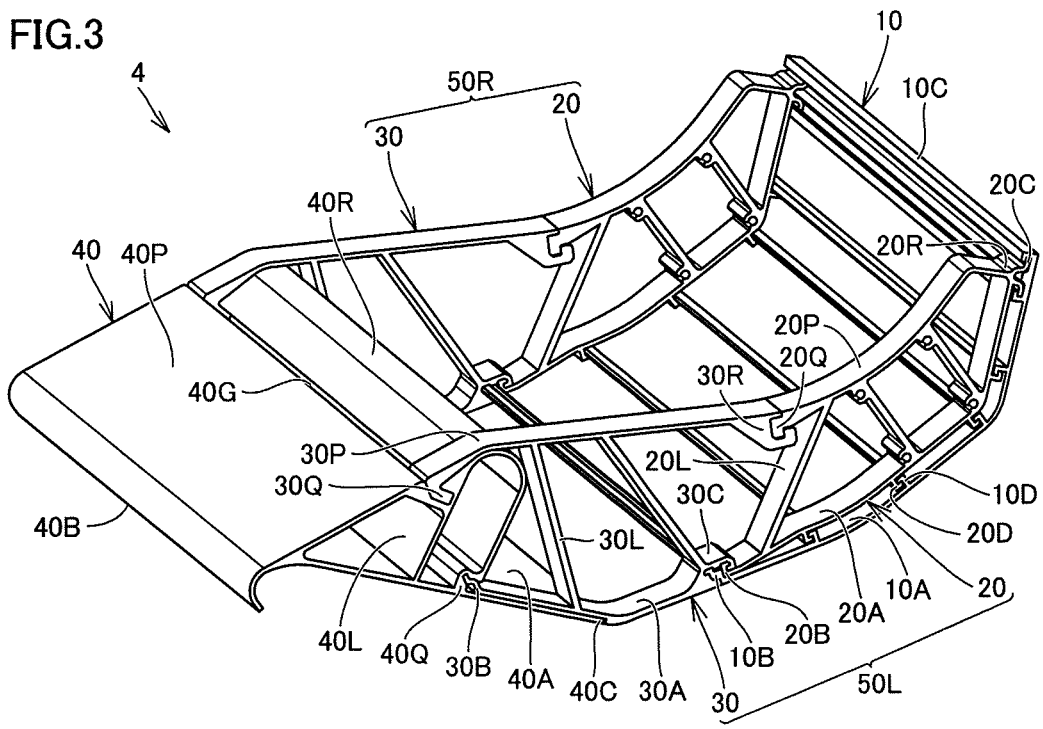
FIG. 3 is a perspective view showing an external appearance example of cushion frame 4 visually recognized when cushion frame 4 is seen from the oblique upper left front side in the first embodiment.
Figure 4:
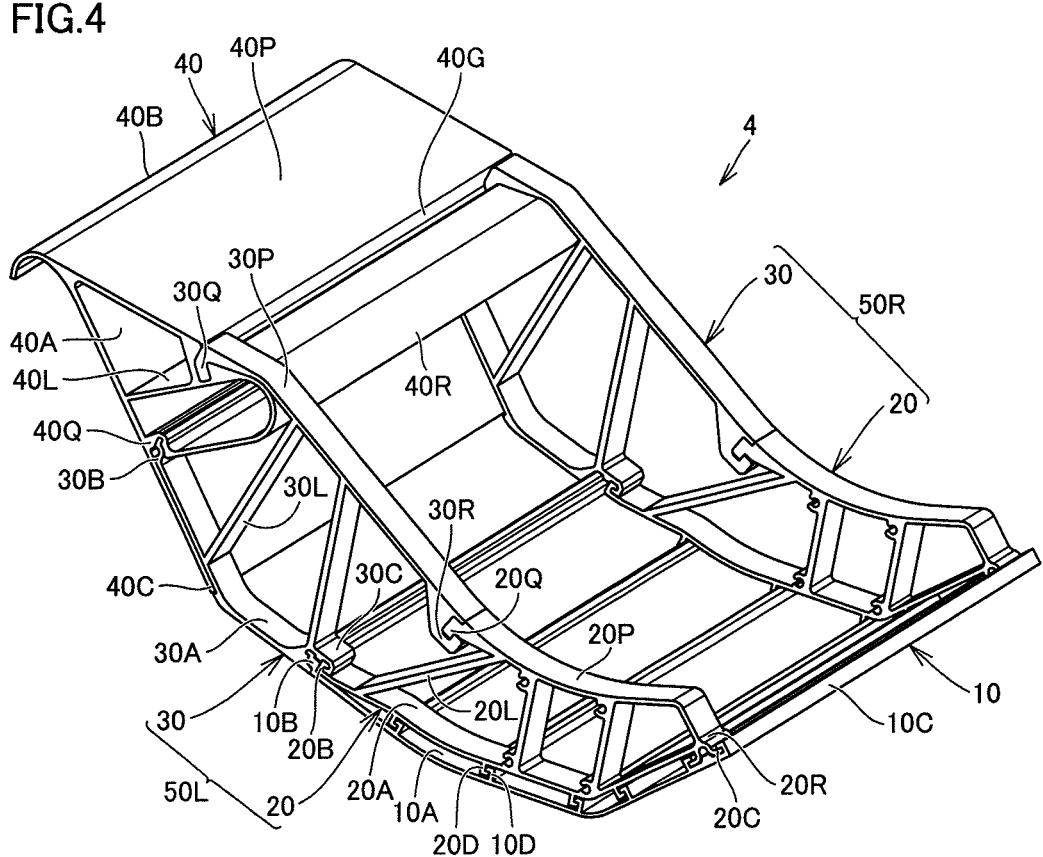
FIG. 4 is a perspective view showing an external appearance example of cushion frame 4 visually recognized when cushion frame 4 is seen from the oblique upper left rear side in the first embodiment.
Figure 5:
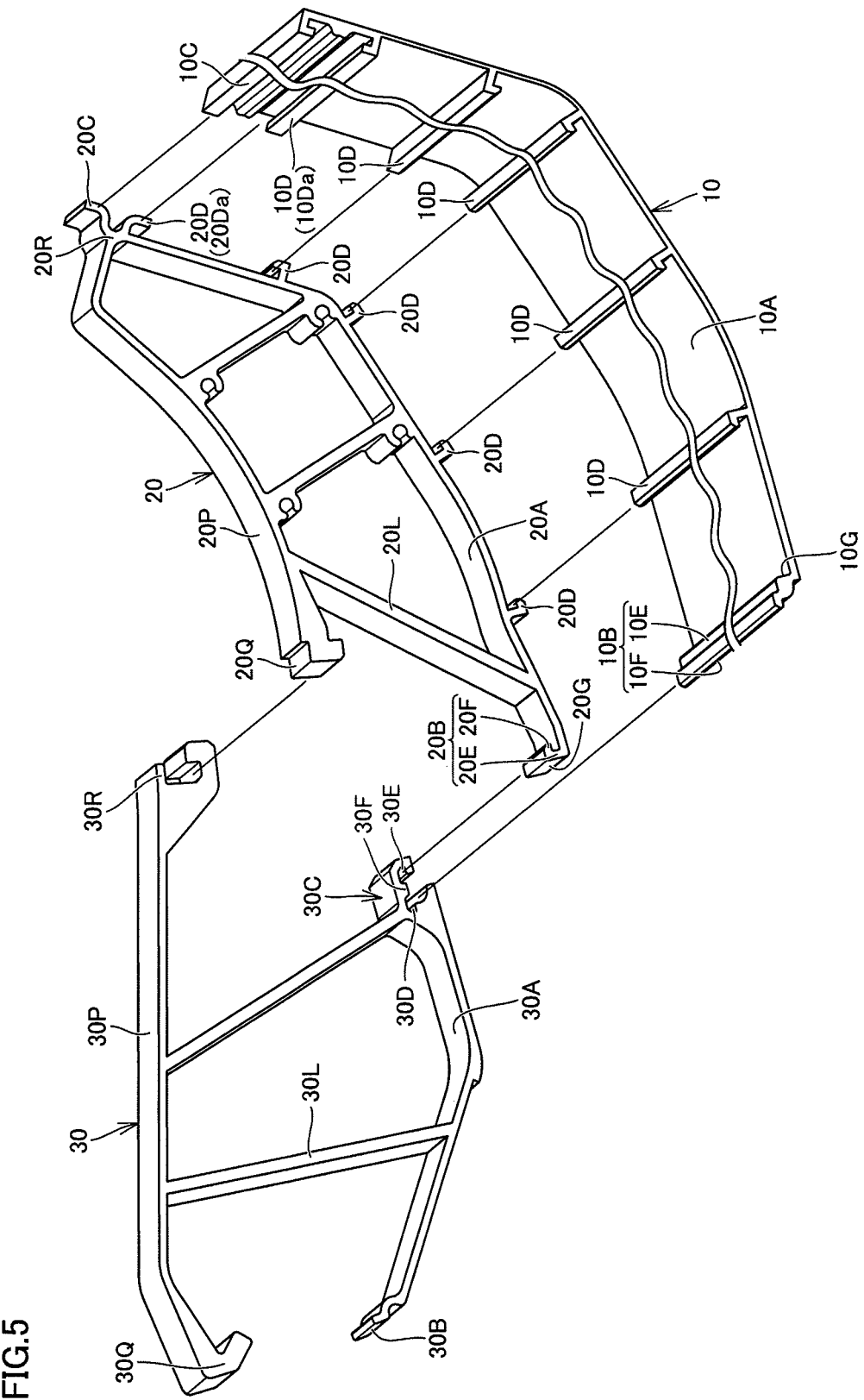
FIG. 5 is a perspective view showing a cushion panel 10, a rear frame portion 20 and a front frame portion 30 constituting cushion frame 4, which have been separated from one another, in the first embodiment.

FIG. 2 is a side view showing cushion frame 4. FIG. 3 is a perspective view showing an external appearance example of cushion frame 4 visually recognized when cushion frame 4 is seen from the oblique upper left front side. FIG. 4 is a perspective view showing an external appearance example of cushion frame 4 visually recognized when cushion frame 4 is seen from the oblique upper left rear side. FIG. 5 is a perspective view showing a cushion panel 10, a rear frame portion 20 and a front frame portion 30 constituting cushion frame 4, which have been separated from one another.

As shown in FIGS. 2 to 4, cushion frame 4 includes cushion panel 10, a front panel 40 and a pair of side frames 50L, 50R. Side frames 50L and 50R are disposed at a distance from each other in the right to left direction of vehicle seat 100, namely, a seat width direction. Front panel 40 and cushion panel 10 are disposed between side frames 50L and 50R, and are spaced apart from each other in the front to rear direction. Cushion panel 10 is disposed below rear frame portion 20 in the present embodiment.

Front panel 40 connects front portions of side frames 50L and 50R to each other. Cushion panel 10 connects rear portions of side frames 50L and 50R to each other. Each of side frames 50L and 50R has rear frame portion 20 and front frame portion 30. In the present embodiment, cushion panel 10 corresponds to a "first member," rear frame portion 20 corresponds to a "second member," and front frame portion 30 corresponds to a "third member."

Rear frame portion 20 provided on side frame 50L has the same configuration as rear frame portion 20 provided on side frame 50R. Front frame portion 30 provided on side frame 50L has the same configuration as front frame portion 30 provided on side frame 50R.

(Front Panel 40)

Front panel 40 includes a lower surface portion 40A, a front end portion 40B, a rear end portion 40C, an upper surface portion 40P, an intermediate connection portion 40Q, a curved portion 40R, a fitting groove 40G, and a support rib 40L, all of which are formed to extend in the seat width direction. Front panel 40 is fabricated by being cut from an extrusion material made of an aluminum alloy or a magnesium alloy having a constant cross sectional shape in a direction orthogonal to the seat width direction.

Upper surface portion 40P has the shape of a plate, and extends from front end portion 40B to intermediate connection portion 40Q. Curved portion 40R is provided at a position of upper surface portion 40P between front end portion 40B and intermediate connection portion 40Q. Fitting groove 40G is provided between front end portion 40B and curved portion 40R. Fitting groove 40G has a concave shape with an open upper side, and extends in the seat width direction.

Lower surface portion 40A has the shape of a plate, connects front end portion 40B and intermediate connection portion 40Q to each other, and extends from front end portion 40B to rear end portion 40C. Intermediate connection portion 40Q has a concave shape with an open lower side, and extends in the seat width direction. Support rib 40L rises from lower surface portion 40A, and extends from lower surface portion 40A toward curved portion 40R.

(Cushion Panel 10 (First Member))

Figure 6:
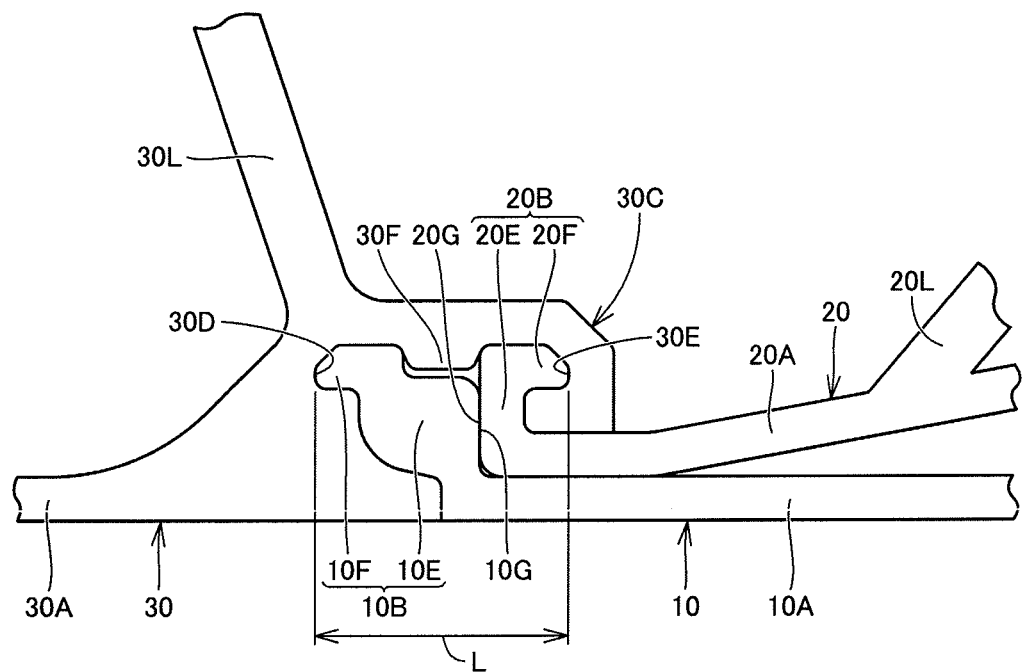
FIG. 6 is a side view showing a region enclosed by a line VI in FIG. 2 in an enlarged manner.

FIG. 6 is a side view showing a region enclosed by a line VI in FIG. 2 in an enlarged manner. Referring mainly to FIGS. 5 and 6, cushion panel 10 (FIG. 5) includes a base portion 10A, a front end portion 10B, a rear end portion 10C, and a plurality of ribs 10D, all of which are formed to extend in the seat width direction. Cushion panel 10 is also fabricated by being cut from an extrusion material made of an aluminum alloy or a magnesium alloy having a constant cross sectional shape in the direction orthogonal to the seat width direction.

Base portion 10A has the shape of a plate, and a portion of base portion 10A between front end portion 10B and rear end portion 10C is curved (FIG. 5). Front end portion 10B is provided with a rising wall portion 10E and an engaging pawl 10F (first engaging pawl). Rising wall portion 10E is provided between base portion 10A and engaging pawl 10F (FIG. 6), and a rearwardly located surface of rising wall portion 10E constitutes a pressing surface 10G as a first pressing surface (first facing surface). Engaging pawl 10F is provided on the top of rising wall portion 10E and formed to face forward.

The plurality of ribs 10D are provided on base portion 10A between front end portion 10B and rear end portion 10C, and are formed such that they are arranged at a distance from one another in the front to rear direction. Ribs 10D and rear end portion 10C are each substantially L-shaped in side view, and extend along the seat width direction. A rearmost located rib 10D (10Da) of the plurality of ribs 10D faces rear end portion 10C (FIG. 5).

(Rear Frame Portion 20 (Second Member))

Rear frame portion 20 (see FIG. 5) includes a lower surface portion 20A, a lower front end portion 20B, a rear end portion 20C, an upper surface portion 20P, an upper front end portion 20Q, a connection portion 20R, a plurality of support ribs 20L and a plurality of ribs 20D, all of which are formed to extend in the seat width direction. Rear frame portion 20 is also fabricated by being cut from an extrusion material made of an aluminum alloy or a magnesium alloy having a constant cross sectional shape in the direction orthogonal to the seat width direction.

Upper surface portion 20P has the shape of a plate, and extends from upper front end portion 20Q to connection portion 20R. Upper front end portion 20Q has a downwardly protruding convex shape. Lower surface portion 20A has the shape of a plate, and extends from lower front end portion 20B to connection portion 20R. Upper surface portion 20P and lower surface portion 20A face each other, and are connected to each other at the position of connection portion 20R. The plurality of support ribs 20L are provided between upper surface portion 20P and lower surface portion 20A.

Lower front end portion 20B is provided with a rising wall portion 20E and an engaging pawl 20F (second engaging pawl). Rising wall portion 20E is provided between lower surface portion 20A and engaging pawl 20F (FIG. 6), and a forwardly located surface of rising wall portion 20E constitutes a pressing surface 20G as a second pressing surface (second facing surface). Engaging pawl 20F is provided on the top of rising wall portion 20E and formed to face rearward.

The plurality of ribs 20D are provided on lower surface portion 20A between lower front end portion 20B and rear end portion 20C, and are formed such that they are arranged at a distance from one another in the front to rear direction. Ribs 20D and rear end portion 20C are each substantially L-shaped in side view, and extend along the seat width direction. A rearmost located rib 20D (20Da) of the plurality of ribs 20D faces away from rear end portion 20C (FIG. 5).

(Front Frame Portion 30 (Third Member))

Front frame portion 30 (FIG. 5) includes a lower surface portion 30A, a lower front end portion 30B, a lower rear end portion 30C, an upper surface portion 30P, an upper front end portion 30Q, an upper rear end portion 30R, and a plurality of support ribs 30L, all of which are formed to extend in the seat width direction. Front frame portion 30 is also fabricated by being cut from an extrusion material made of an aluminum alloy or a magnesium alloy having a constant cross sectional shape in the direction orthogonal to the seat width direction.

Upper surface portion 30P has the shape of a plate, and extends from upper front end portion 30Q to upper rear end portion 30R. Lower surface portion 30A has the shape of a plate, and extends from lower front end portion 30B to lower rear end portion 30C. Upper surface portion 30P and lower surface portion 30A face each other, with the plurality of support ribs 30L provided between upper surface portion 30P and lower surface portion 30A.

Upper front end portion 30Q has a downwardly protruding convex shape, and upper rear end portion 30R has a concave shape with an open upper side. Lower front end portion 30B has an upwardly protruding convex shape. Lower rear end portion 30C (FIG. 6) has a concave shape with an open lower side, with a concave portion 30D (first concave portion), a concave portion 30E (second concave portion) and a protrusion 30F provided on the inner side of this concave shape.

As shown in FIG. 6, concave portion 30D is provided forward relative to concave portion 30E. In the present embodiment, concave portion 30D is provided forward as seen from protrusion 30F, and concave portion 30E is provided rearward as seen from protrusion 30F. In the present embodiment, concave portions 30D and 30E are formed to face each other.

[Assembly of Front Panel 40 and Front Frame Portion 30]

Fitting groove 40G and intermediate connection portion 40Q provided on front panel 40 (FIGS. 2 to 4) extend in the seat width direction. Upper front end portion 30Q of each of side frames 50L and 50R (front frame portions 30 and 30) is fitted into fitting groove 40G. Fitting groove 40G and upper front end portion 30Q are fitted together while making sliding contact with each other in the seat width direction. Lower front end portion 30B of each of side frames 50L and 50R (front frame portions 30 and 30) is fitted into intermediate connection portion 40Q. Intermediate connection portion 40Q and lower front end portion 30B are fitted together while making sliding contact with each other in the seat width direction.

A gap (cylindrical space) may be formed between intermediate connection portion 40Q and lower front end portion 30B. A screw not shown in the figure is inserted into this gap from the outer side in the seat width direction. The insertion of the screw causes lower front end portion 30B to be deformed to have an increased inside diameter (radius of curvature), resulting in an outer surface of lower front end portion 30B being brought into pressure contact with an inner surface of intermediate connection portion 40Q. Intermediate connection portion 40Q and lower front end portion 30B can be fitted together with greater force.

[Assembly of Cushion Panel 10, Rear Frame Portion 20 and Front Frame Portion 30]

Cushion panel 10 is disposed below rear frame portion 20. Rear end portion 10C and ribs 10D provided on cushion panel 10 (FIGS. 2 to 4) extend in the seat width direction. Rear end portion 20C of rear frame portion 20 is fitted on the inner side of rear end portion 10C of cushion panel 10. Rear end portions 10C and 20C are fitted together while making sliding contact with each other in the seat width direction. Each of the plurality of ribs 10D and each of the plurality of ribs 20D are also similarly fitted together while making sliding contact with each other in the seat width direction.

A gap (cylindrical space) may be formed between rear end portion 20C and rib 20D (20Da). A screw not shown in the figure is inserted into this gap from the outer side in the seat width direction. The insertion of the screw causes rear end portion 20C to be deformed to have an increased inside diameter, resulting in an outer surface of rear end portion 20C being brought into pressure contact with an inner surface of rear end portion 10C. Rear end portions 10C and 20C can be fitted together with greater force. Similarly, rib 20D (20Da) is also deformed to have an increased inside diameter, resulting in an outer surface of rib 20D (20Da) being brought into pressure contact with an inner surface of rib 10D (10Da). Rib 10D (10Da) and rib 20D (20Da) can be fitted together with greater force.

Upper front end portion 20Q of rear frame portion 20 is fitted on the inner side of upper rear end portion 30R of front frame portion 30. Upper rear end portion 30R and upper front end portion 20Q are fitted together while making sliding contact with each other in the seat width direction. Lower front end portion 20B of rear frame portion 20 and front end portion 10B of cushion panel 10 are fitted on the inner side of lower rear end portion 30C of front frame portion 30. Lower rear end portion 30C, lower front end portion 20B and front end portion 10B are fitted together while making sliding contact with one another in the seat width direction.

As shown in FIG. 6, engaging pawl 10F (first engaging pawl) is disposed on the inner side of concave portion 30D (first concave portion), and engaging pawl 20F (second engaging pawl) is disposed on the inner side of concave portion 30E (second concave portion). A length L is defined between a front end of engaging pawl 10F and a rear end of engaging pawl 20F, with pressing surfaces 10G and 20G being in contact with each other. The length between a front end of concave portion 30D and a rear end of concave portion 30E is set to be shorter than this length L.

Accordingly, when engaging pawl 10F is disposed on the inner side of concave portion 30D and engaging pawl 20F is disposed on the inner side of concave portion 30E, at least a portion of pressing surface 10G and at least a portion of pressing surface 20G press each other. With at least a portion of pressing surface 10G and at least a portion of pressing surface 20G pressing each other, reaction force generated by the pressing remains in an assembled state, thereby allowing engaging pawl 10F to engage with concave portion 30D with greater force, and allowing engaging pawl 20F to engage with concave portion 30E with greater force.

(Function and Effect)

Front frame portion 30 and rear frame portion 20 are integrated together while cooperating with front end portion 10B of cushion panel 10, to form side frame 50L. This is also the case with side frame 50R. Side frames 50L and 50R are integrated together with front panel 40 and cushion panel 10 interposed therebetween, to form cushion frame 4.

In the present embodiment, engaging pawl 10F engages with concave portion 30D and engaging pawl 20F engages with concave portion 30E, in such a manner that at least portions of pressing surfaces 10G and 20G press each other. Cushion panel 10, rear frame portion 20 and front frame portion 30 are integrated together through these engagements. These members constituting the framework of vehicle seat 100 (FIG. 1) can be joined together without using a welding process, so that manufacturing costs can be reduced as they do not involve the costs for a welding facility and a welding process. According to the present embodiment, manufacturing costs can be reduced for a similar reason even in comparison to an example where they are joined using rivets and the like.

As described above, concave portion 30D (first concave portion) and concave portion 30E (second concave portion) are formed to face each other. If an imaginary straight line were drawn connecting concave portion 30D and concave portion 30E, each of pressing surfaces 10G and 20G has a relation substantially orthogonal to this straight line. At least a portion of pressing surface 10G and at least a portion of pressing surface 20G press each other, and reaction force is generated by this pressing. Since the substantially orthogonal relation as described above is satisfied, this reaction force is efficiently used for the engagement between engaging pawl 10F and concave portion 30D and for the engagement between engaging pawl 20F and concave portion 30E.

[First Variation of First Embodiment]

Figure 7:
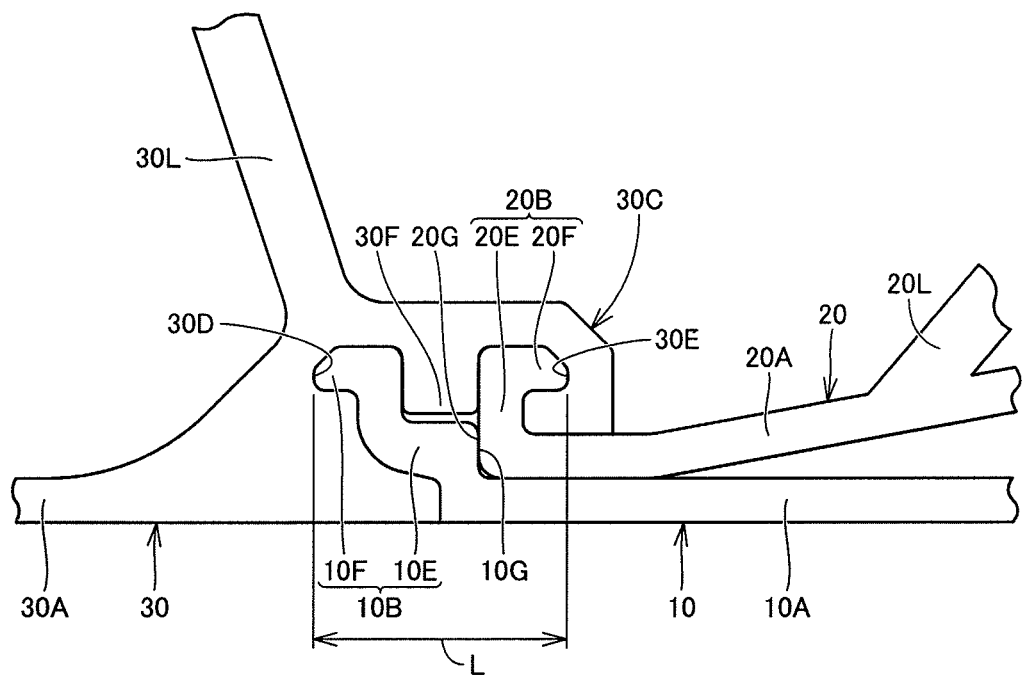
FIG. 7 is a side view showing a portion of the vehicle seat in a first variation of the first embodiment.

FIG. 7 is a side view showing a portion of the vehicle seat in a first variation of the first embodiment, and corresponds to FIG. 6. Lower rear end portion 30C shown in FIG. 7 also has a concave shape with an open lower side, with concave portion 30D (first concave portion), concave portion 30E (second concave portion) and protrusion 30F provided on the inner side of lower rear end portion 30C. Protrusion 30F is located between concave portions 30D and 30E. Protrusion 30F shown in FIG. 7 extends more downward than protrusion 30F shown in FIG. 6.

Protrusion 30F is disposed between pressing surfaces 10G and 20G. Specifically, protrusion 30F is disposed between a portion of pressing surface 10G not in contact with pressing surface 20G and a portion of pressing surface 20G not in contact with pressing surface 10G, and protrusion 30F presses pressing surface 10G forward while pressing pressing surface 20G rearward. Reaction force generated by the pressing remains in an assembled state. Engaging pawl 10F can engage with concave portion 30D with greater force, and engaging pawl 20F can engage with concave portion 30E with greater force. These members constituting the framework of the vehicle seat can be joined together without using a welding process.

[Second Variation of First Embodiment]

In the example shown in FIG. 7 (the first variation of the first embodiment), protrusion 30F presses engaging pawl 10F forward through pressing surface 10G, and protrusion 30F presses engaging pawl 20F rearward through pressing surface 20G.

Figure 8:
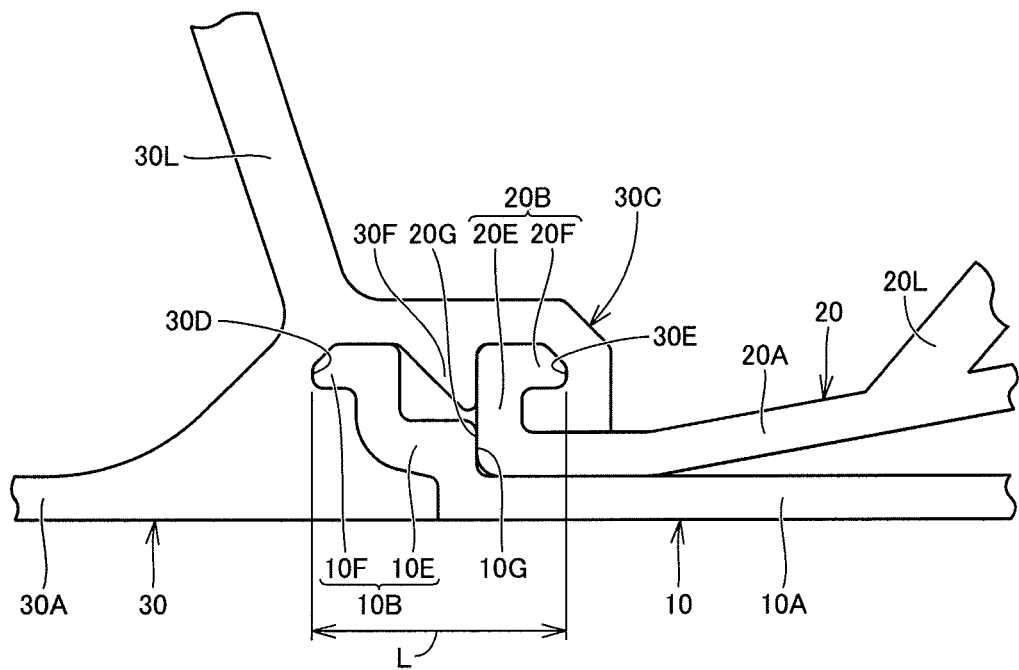
FIG. 8 is a side view showing a portion of the vehicle seat in a second variation of the first embodiment.

As shown in FIG. 8, protrusion 30F may press at least one of pressing surface 10G and pressing surface 20G. In the example shown in FIG. 8, protrusion 30F presses engaging pawl 20F rearward through pressing surface 20G.

[Third Variation of First Embodiment]

Figure 9:
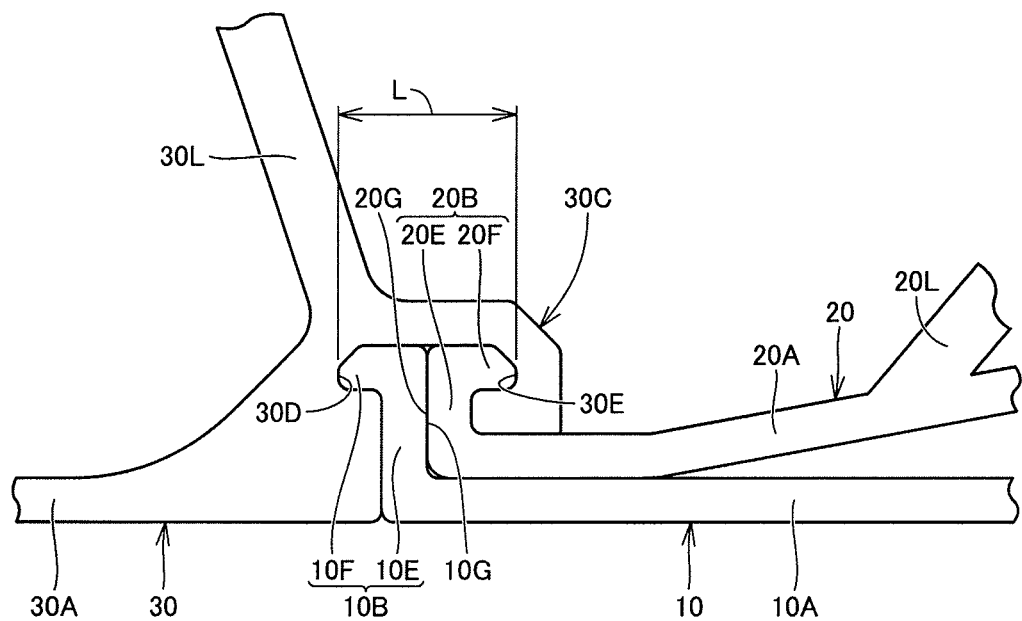
FIG. 9 is a side view showing a portion of the vehicle seat in a third variation of the first embodiment.

As shown in FIG. 9, protrusion 30F does not need to be provided on the inner side of lower rear end portion 30C. In this case, too, when engaging pawl 10F is disposed on the inner side of concave portion 30D and engaging pawl 20F is disposed on the inner side of concave portion 30E, at least a portion of pressing surface 10G and at least a portion of pressing surface 20G press each other. Engaging pawl 10F can engage with concave portion 30D with greater force, and engaging pawl 20F can engage with concave portion 30E with greater force. These members constituting the framework of the vehicle seat can be joined together without using a welding process.

[Fourth Variation of First Embodiment]

Figure 10:
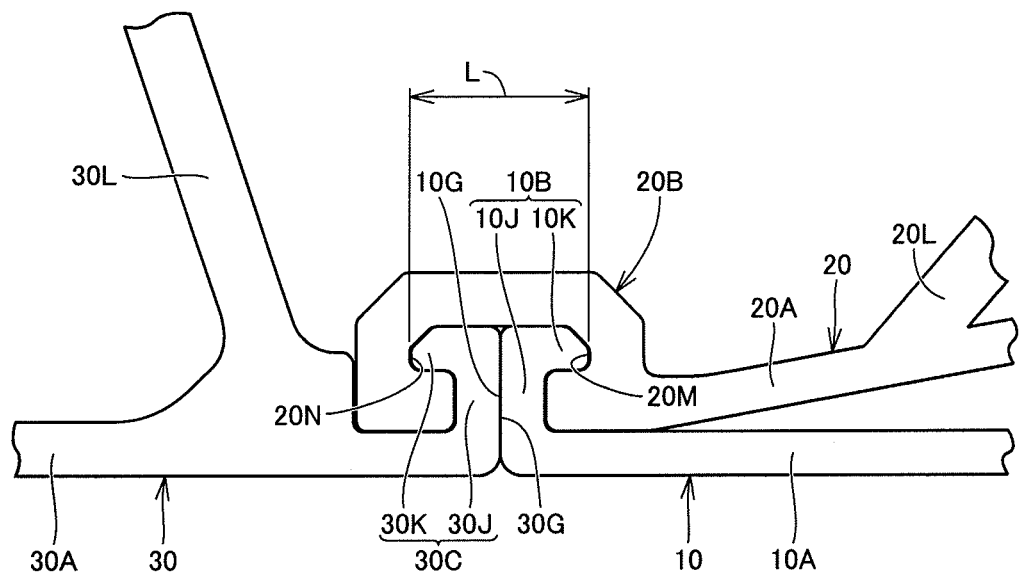
FIG. 10 is a side view showing a portion of the vehicle seat in a fourth variation of the first embodiment.

In the first embodiment and its first to third variations described above, cushion panel 10 corresponds to the "first member," rear frame portion 20 corresponds to the "second member," and front frame portion 30 corresponds to the "third member." In an example shown in FIG. 10 (a fourth variation of the first embodiment), on the other hand, cushion panel 10 corresponds to the "first member," front frame portion 30 corresponds to the "second member," and rear frame portion 20 corresponds to the "third member."

As shown in FIG. 10, front end portion 10B of cushion panel 10 is provided with a rising wall portion 10J and an engaging pawl 10K (first engaging pawl). Rising wall portion 10J is provided between base portion 10A and engaging pawl 10K, and a forwardly located surface of rising wall portion 10J constitutes pressing surface 10G as the first pressing surface (first facing surface). Engaging pawl 10K is provided on the top of rising wall portion 10J and formed to face rearward.

Lower rear end portion 30C of front frame portion 30 is provided with a rising wall portion 30J and an engaging pawl 30K (second engaging pawl). Rising wall portion 30J is provided between lower surface portion 30A and engaging pawl 30K, and a rearwardly located surface of rising wall portion 30J constitutes a pressing surface 30G as the second pressing surface (second facing surface). Engaging pawl 30K is provided on the top of rising wall portion 30J and formed to face forward.

Lower front end portion 20B of rear frame portion 20 has a concave shape with an open lower side, with a concave portion 20M (first concave portion) and a concave portion 20N (second concave portion) provided on the inner side of lower front end portion 20B. Concave portions 20M and 20N are formed to face each other.

Engaging pawl 10K (first engaging pawl) is disposed on the inner side of concave portion 20M (first concave portion), and engaging pawl 30K (second engaging pawl) is disposed on the inner side of concave portion 20N (second concave portion). Length L is defined between a rear end of engaging pawl 10K and a front end of engaging pawl 30K, with pressing surfaces 10G and 20G being in contact with each other. The length between a rear end of concave portion 20M and a front end of concave portion 20N is set to be shorter than this length L.

When engaging pawl 10K is disposed on the inner side of concave portion 20M and engaging pawl 30K is disposed on the inner side of concave portion 20N, at least a portion of pressing surface 10G and at least a portion of pressing surface 30G press each other. With at least a portion of pressing surface 10G and at least a portion of pressing surface 30G pressing each other, reaction force generated by the pressing remains in an assembled state, thereby allowing engaging pawl 10K to engage with concave portion 20M with greater force, and allowing engaging pawl 30K to engage with concave portion 20N with greater force. These members constituting the framework of the vehicle seat can be joined together without using a welding process.

[Fifth Variation of First Embodiment]

Figure 11:
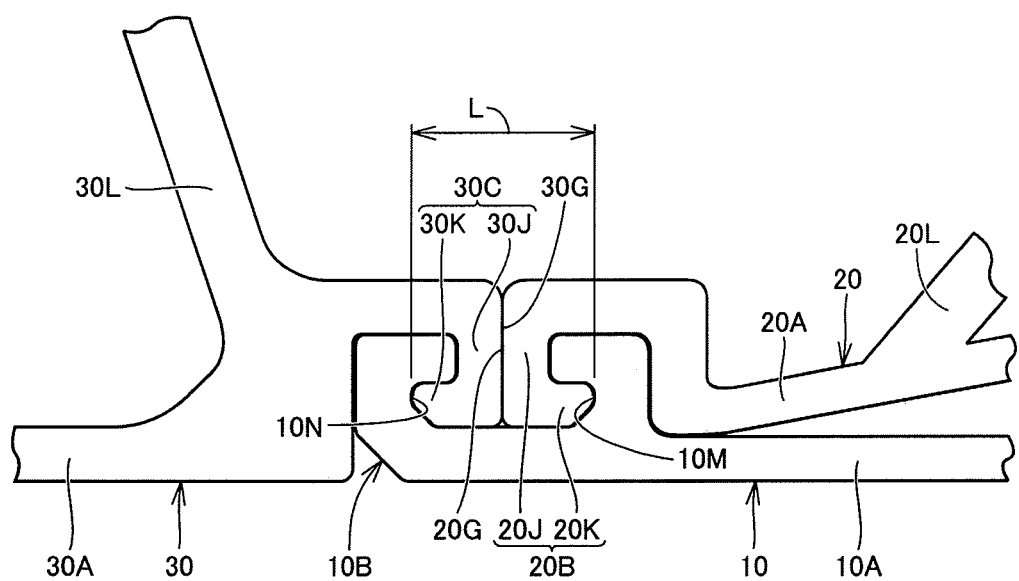
FIG. 11 is a side view showing a portion of the vehicle seat in a fifth variation of the first embodiment.

In an example shown in FIG. 11 (a fifth variation of the first embodiment), front frame portion 30 corresponds to the "first member," rear frame portion 20 corresponds to the "second member," and cushion panel 10 corresponds to the "third member."

As shown in FIG. 11, lower rear end portion 30C of front frame portion 30 is provided with rising wall portion 30J and engaging pawl 30K (first engaging pawl). Rising wall portion 30J is provided between lower surface portion 30A and engaging pawl 30K, and a rearwardly located surface of rising wall portion 30J constitutes pressing surface 30G as the first pressing surface (first facing surface). Engaging pawl 30K is provided on the bottom of rising wall portion 30J and formed to face forward.

Lower front end portion 20B of rear frame portion 20 is provided with a rising wall portion 20J and an engaging pawl 20K (second engaging pawl). Rising wall portion 20J is provided between lower surface portion 20A and engaging pawl 20K, and a forwardly located surface of rising wall portion 20J constitutes pressing surface 20G as the second pressing surface (second facing surface). Engaging pawl 20K is provided on the bottom of rising wall portion 20J and formed to face rearward.

Front end portion 10B of cushion panel 10 has a concave shape with an open upper side, with a concave portion 10N (first concave portion) and a concave portion 10M (second concave portion) provided on the inner side of front end portion 10B. Concave portions 10N and 10M are formed to face each other.

Engaging pawl 30K (first engaging pawl) is disposed on the inner side of concave portion 10N (first concave portion), and engaging pawl 20K (second engaging pawl) is disposed on the inner side of concave portion 10M (second concave portion). Length L is defined between the front end of engaging pawl 30K and a rear end of engaging pawl 20K, with pressing surfaces 30G and 20G being in contact with each other. The length between a front end of concave portion 10N and a rear end of concave portion 10M is set to be shorter than this length L.

When engaging pawl 30K is disposed on the inner side of concave portion 10N and engaging pawl 20K is disposed on the inner side of concave portion 10M, at least a portion of pressing surface 30G and at least a portion of pressing surface 20G press each other. With at least a portion of pressing surface 30G and at least a portion of pressing surface 20G pressing each other, reaction force generated by the pressing remains in an assembled state, thereby allowing engaging pawl 30K to engage with concave portion 10N with greater force, and allowing engaging pawl 20K to engage with concave portion 10M with greater force. These members constituting the framework of the vehicle seat can be joined together without using a welding process.

Second Embodiment

Vehicle seat 100 in a second embodiment is described below with reference to FIGS. 12 to 18.

[Vehicle Seat 100]

Figure 12:
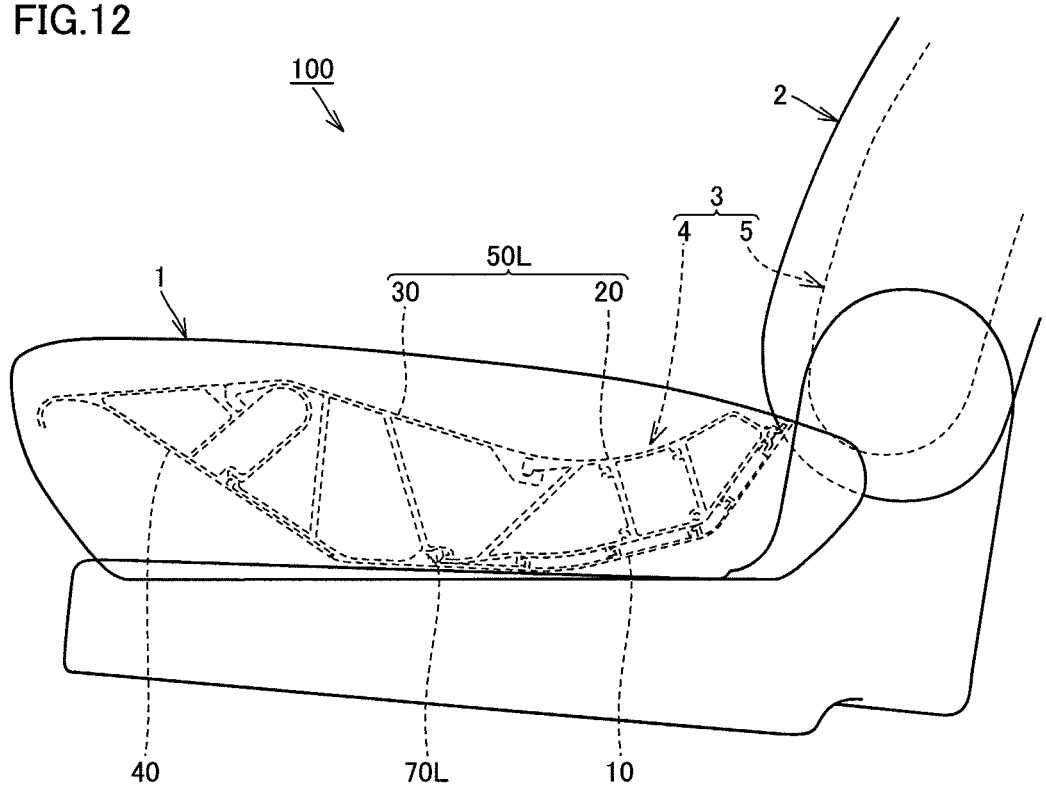
FIG. 12 is a side view showing a general configuration of vehicle seat 100 in a second embodiment.

FIG. 12 is a side view showing a general configuration of vehicle seat 100. Vehicle seat 100 includes seat cushion 1 and seat back 2, and seat frame 3 is provided within vehicle seat 100. Seat frame 3 has cushion frame 4 disposed within seat cushion 1, and back frame 5 disposed within seat back 2. The first and second embodiments are different from each other in the configuration of cushion frame 4 described below. The following description of the second embodiment focuses on and discusses the differences between the first and second embodiments, and description of the features common to the first and second embodiments may not be repeated.

[Cushion Frame 4]

Figure 13:
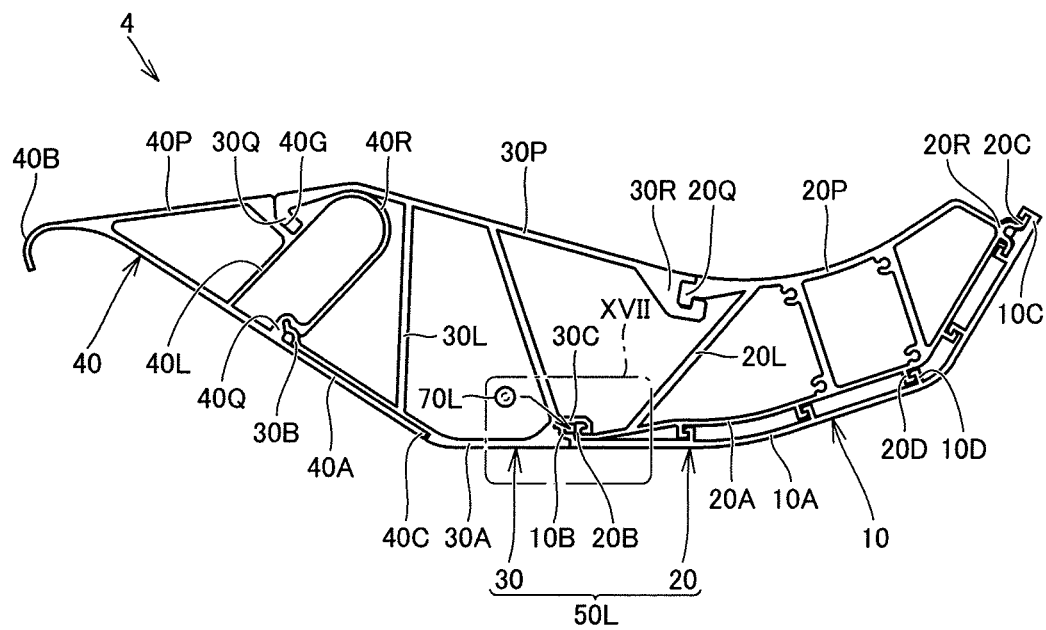
FIG. 13 is a side view showing cushion frame 4 in the second embodiment.
Figure 14:
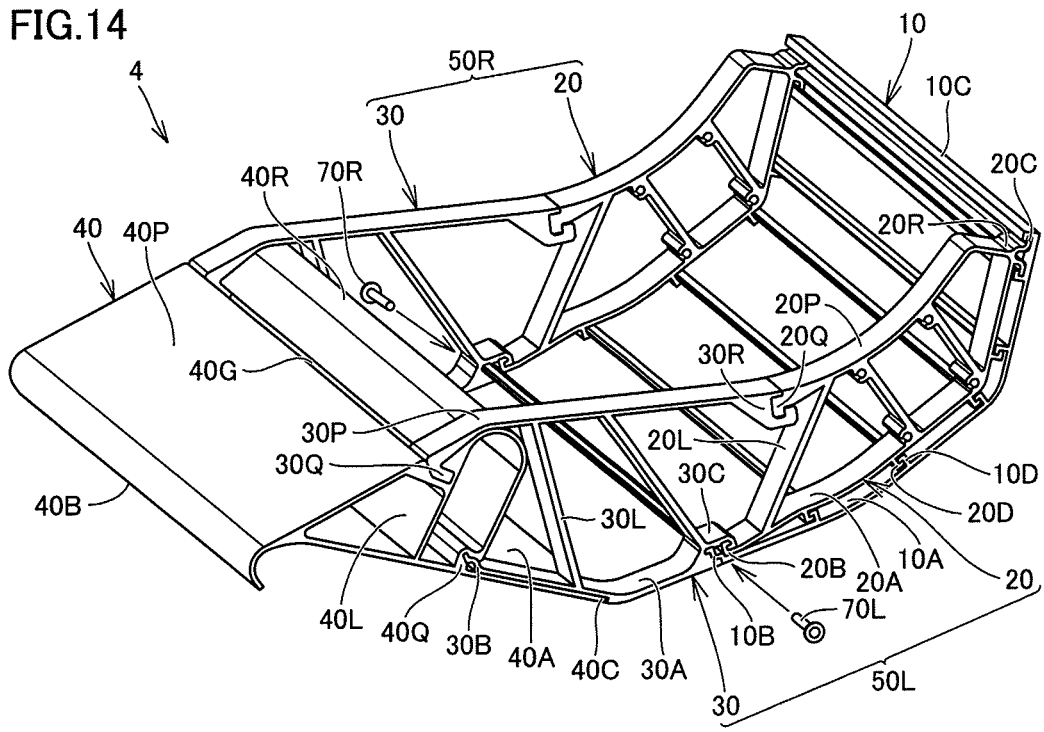
FIG. 14 is a perspective view showing an external appearance example of cushion frame 4 visually recognized when cushion frame 4 is seen from the oblique upper left front side in the second embodiment.
Figure 15:
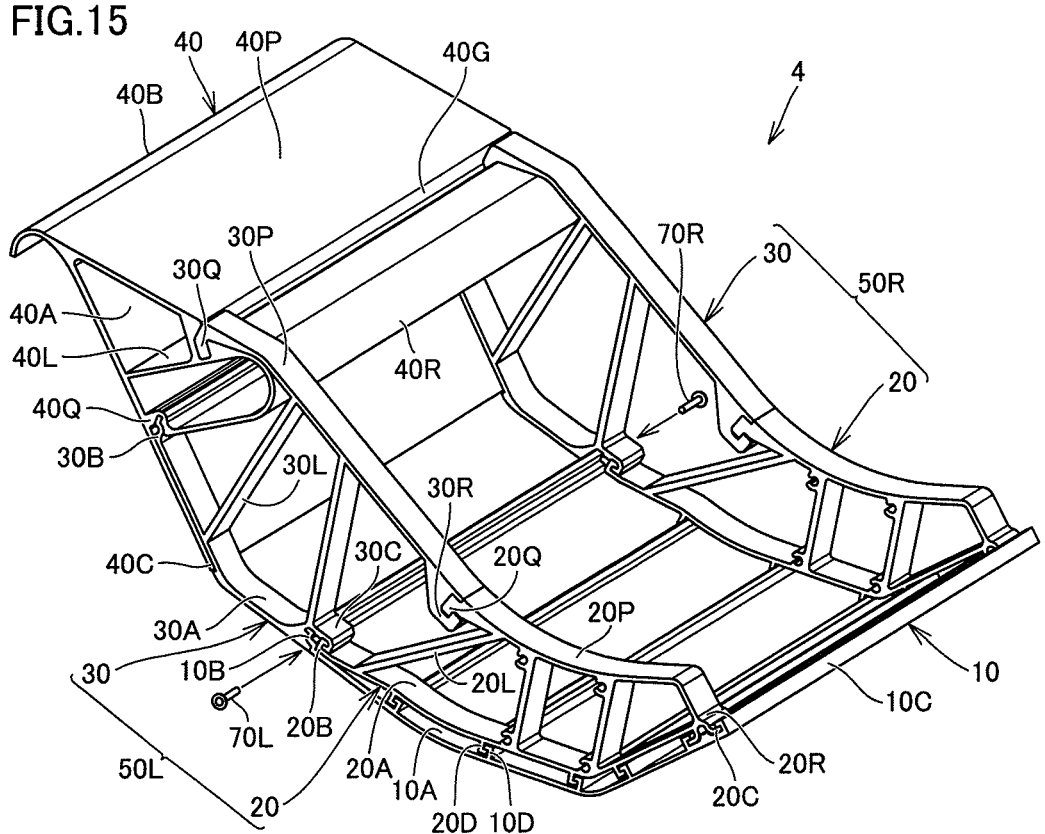
FIG. 15 is a perspective view showing an external appearance example of cushion frame 4 visually recognized when cushion frame 4 is seen from the oblique upper left rear side in the second embodiment.
Figure 16:
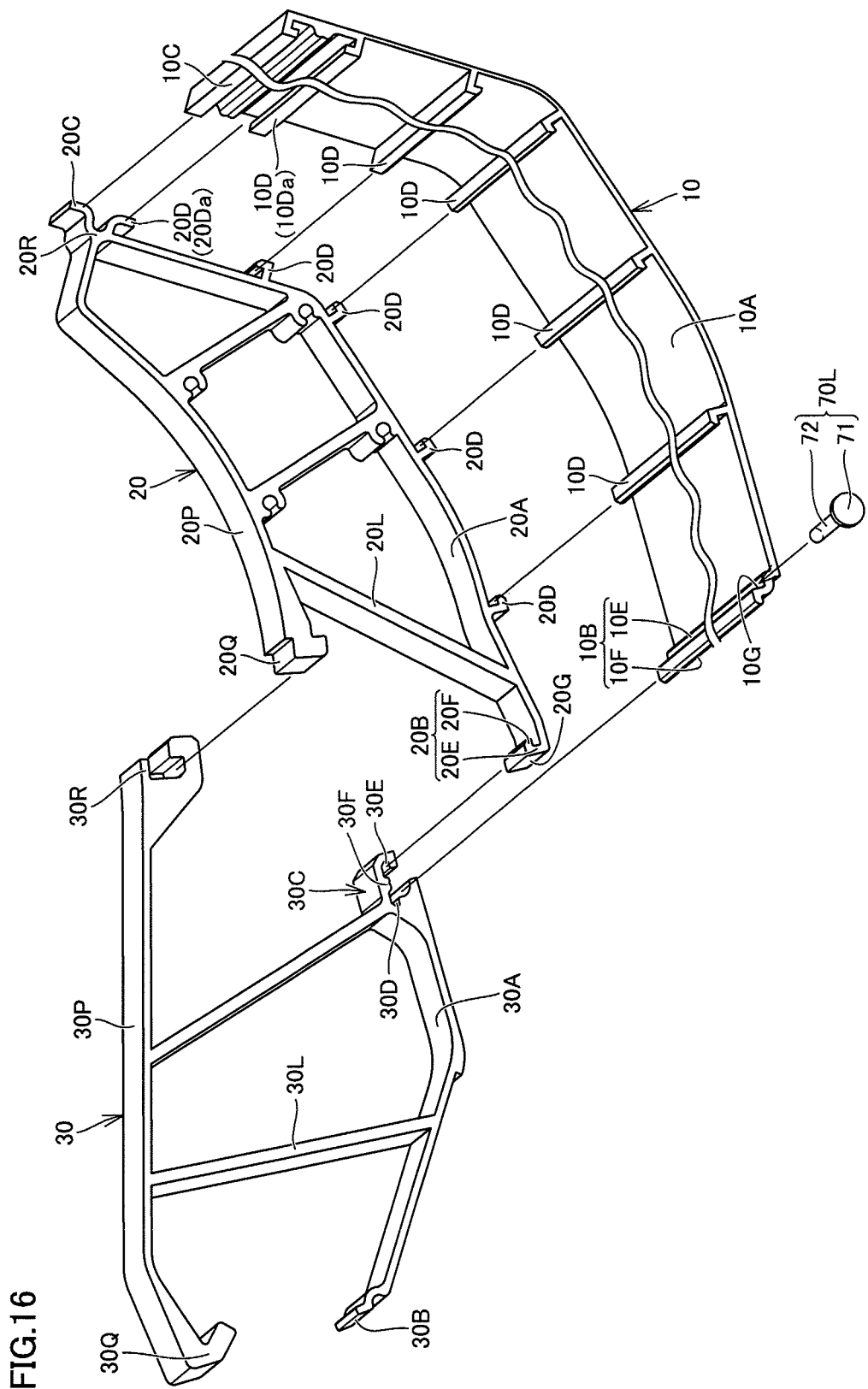
FIG. 16 is a perspective view showing cushion panel 10, rear frame portion 20, front frame portion 30 and a screw 70L constituting cushion frame 4, which have been separated from one another, in the second embodiment.

FIG. 13 is a side view showing cushion frame 4. FIG. 14 is a perspective view showing an external appearance example of cushion frame 4 visually recognized when cushion frame 4 is seen from the oblique upper left front side. FIG. 15 is a perspective view showing an external appearance example of cushion frame 4 visually recognized when cushion frame 4 is seen from the oblique upper left rear side. FIG. 16 is a perspective view showing cushion panel 10, rear frame portion 20, front frame portion 30 and a screw 70L constituting cushion frame 4, which have been separated from one another.

As shown in FIGS. 13 to 15, cushion frame 4 includes cushion panel 10, front panel 40, the pair of side frames 50L, 50R, and a pair of screws 70L, 70R (FIGS. 14 and 15).

(Cushion Panel 10 (First Member))

Figure 17:
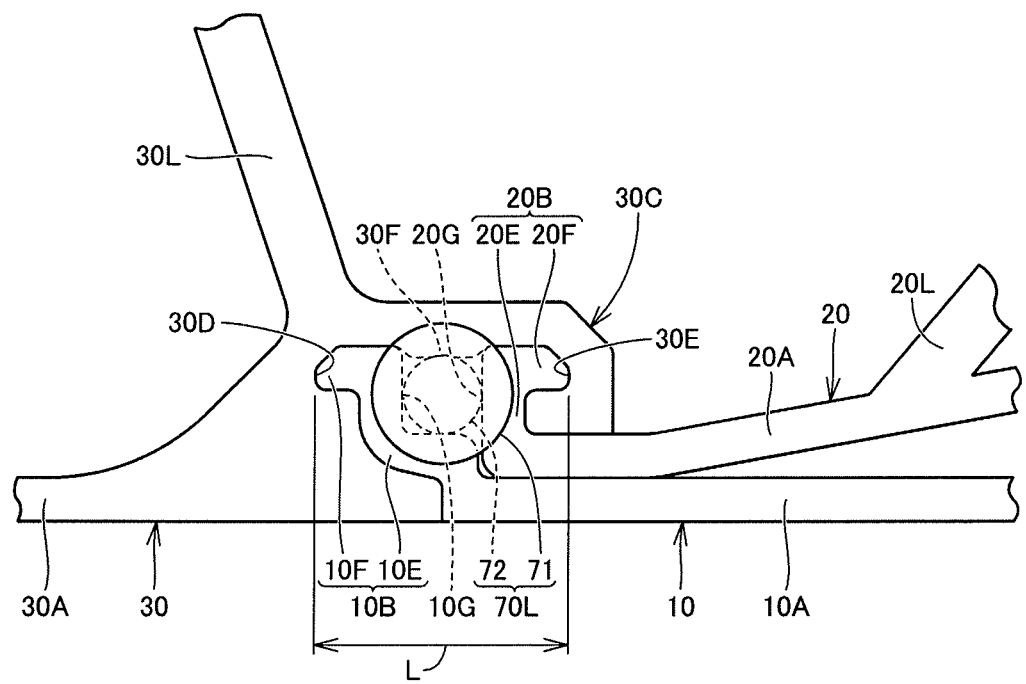
FIG. 17 is a side view showing a region enclosed by a line XVII in FIG. 13 in an enlarged manner.

FIG. 17 is a side view showing a region enclosed by a line XVII in FIG. 13 in an enlarged manner. Referring mainly to FIGS. 16 and 17, cushion panel 10 (FIG. 16) includes base portion 10A, front end portion 10B, rear end portion 10C, and the plurality of ribs 10D.

(Rear Frame Portion 20 (Second Member))

Rear frame portion 20 (see FIG. 16) includes lower surface portion 20A, lower front end portion 20B, rear end portion 20C, upper surface portion 20P, upper front end portion 20Q, connection portion 20R, the plurality of support ribs 20L and the plurality of ribs 20D.

(Front Frame Portion 30 (Third Member))

Front frame portion 30 (FIG. 16) includes lower surface portion 30A, lower front end portion 30B, lower rear end portion 30C, upper surface portion 30P, upper front end portion 30Q, upper rear end portion 30R, and the plurality of support ribs 30L.

[Assembly of Front Panel 40 and Front Frame Portion 30]

Fitting groove 40G and intermediate connection portion 40Q provided on front panel 40 (FIGS. 13 to 15) extend in the seat width direction. Upper front end portion 30Q of each of side frames 50L and 50R (front frame portions 30 and 30) is fitted into fitting groove 40G. Lower front end portion 30B of each of side frames 50L and 50R (front frame portions 30 and 30) is fitted into intermediate connection portion 40Q.

[Assembly of Cushion Panel 10, Rear Frame Portion 20 and Front Frame Portion 30]

Cushion panel 10 is disposed below rear frame portion 20. Rear end portion 10C and ribs 10D provided on cushion panel 10 (FIGS. 13 to 15) extend in the seat width direction. Rear end portion 20C of rear frame portion 20 is fitted on the inner side of rear end portion 10C of cushion panel 10.

Figure 18:
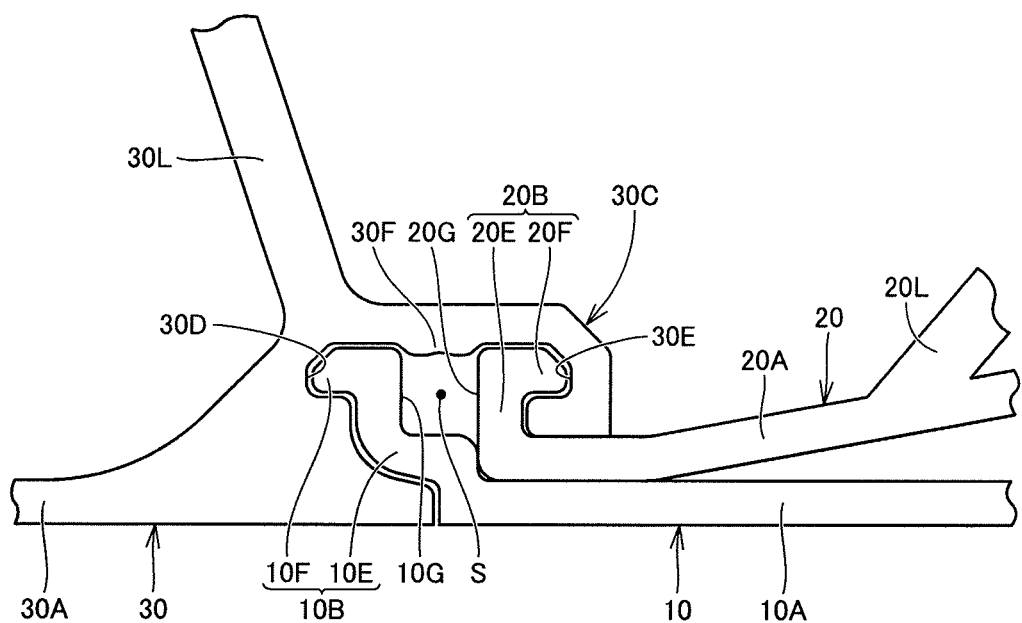
FIG. 18 is a side view showing cushion panel 10, rear frame portion 20 and front frame portion 30 constituting cushion frame 4, with screw 70L removed therefrom, in the second embodiment.

Upper front end portion 20Q of rear frame portion 20 is fitted on the inner side of upper rear end portion 30R of front frame portion 30. Upper rear end portion 30R and upper front end portion 20Q are fitted together while making sliding contact with each other in the seat width direction. Lower front end portion 20B of rear frame portion 20 and front end portion 10B of cushion panel 10 are disposed on the inner side of lower rear end portion 30C of front frame portion 30. FIG. 18 is a side view showing cushion panel 10, rear frame portion 20 and front frame portion 30 constituting cushion frame 4, with screw 70L removed therefrom.

As shown in FIGS. 17 and 18, lower front end portion 20B and front end portion 10B are disposed on the inner side of lower rear end portion 30C. It is preferable that each of lower front end portion 20B and front end portion 10B be formed to have an outer surface a size smaller than the shape of an inner surface of lower rear end portion 30C, such that lower front end portion 20B and front end portion 10B can be readily disposed on the inner side of lower rear end portion 30C. A gap S having a substantially cylindrical shape (FIG. 18) is formed between protrusion 30F of lower rear end portion 30C, pressing surface 10G (pressed surface) of front end portion 10B, and pressing surface 20G (pressed surface) of lower front end portion 20B. Screw 70L (inserted member) is inserted into gap S from the outer side in the seat width direction.

Screw 70L (FIG. 17) includes a head 71 and a shank 72. Shank 72 has a diameter larger than gap S, and is press fitted into space between pressing surfaces 10G and 20G (into gap S) from the outer side in the seat width direction. Such configuration is not restrictive. An outer circumferential surface of shank 72 may be provided with an external thread and pressing surfaces 10G and 20G may each be provided with an internal thread, so that shank 72 may be rotated and inserted into space between pressing surfaces 10G and 20G.

When engaging pawl 10F is disposed on the inner side of concave portion 30D, engaging pawl 20F is disposed on the inner side of concave portion 30E, and screw 70L is disposed in gap S between pressing surfaces 10G and 20G, shank 72 faces pressing surface 10G, and pressing surface 10G is pressed forward by shank 72. Biasing force generated by the pressing remains in an assembled state, causing an outer surface of engaging pawl 10F to be brought into pressure contact with an inner surface of concave portion 30D, thereby allowing engaging pawl 10F to engage with concave portion 30D with greater force. Similarly, shank 72 faces pressing surface 20G, and pressing surface 20G is pressed rearward by shank 72. Biasing force generated by the pressing remains in an assembled state, causing an outer surface of engaging pawl 20F to be brought into pressure contact with an inner surface of concave portion 30E, thereby allowing engaging pawl 20F to engage with concave portion 30E with greater force. These mechanisms similarly apply to screw 70R as the other inserted member (FIGS. 14 and 15).

(Function and Effect)

Front frame portion 30 and rear frame portion 20 are integrated together while cooperating with screw 70L and front end portion 10B of cushion panel 10, to form side frame 50L. This is also the case with screw 70R and side frame 50R. Side frames 50L and 50R are integrated together with front panel 40 and cushion panel 10 interposed therebetween, to form cushion frame 4.

In the present embodiment, engaging pawl 10F engages with concave portion 30D and engaging pawl 20F engages with concave portion 30E, in such a manner that screws 70L and 70R press pressing surfaces 10G and 20G. Cushion panel 10, rear frame portion 20 and front frame portion 30 are integrated together through these engagements. These members constituting the framework of vehicle seat 100 (FIG. 12) can be joined together without using a welding process, so that manufacturing costs can be reduced as they do not involve the costs for a welding facility and a welding process. According to the present embodiment, manufacturing costs can be reduced for a similar reason even in comparison to an example where they are joined using rivets and the like.

As described above, concave portion 30D (first concave portion) and concave portion 30E (second concave portion) are formed to face each other. If an imaginary straight line were drawn connecting concave portion 30D and concave portion 30E, each of pressing surfaces 10G and 20G has a relation substantially orthogonal to this straight line. Screws 70L and 70R press pressing surfaces 10G and 20G, and biasing force is generated by this pressing. Since the substantially orthogonal relation as described above is satisfied, this biasing force is efficiently used for the engagement between engaging pawl 10F and concave portion 30D and for the engagement between engaging pawl 20F and concave portion 30E.

Both screws 70L and 70R have head 71 provided on the outer side of shank 72 in the seat width direction. Head 71 of each of screws 70L and 70R can make contact with rising wall portion 10E of cushion panel 10, rising wall portion 20E of rear frame portion 20, and protrusion 30F of front frame portion 30 from the outer side in the seat width direction, thereby defining relative positions of cushion panel 10, rear frame portion 20 and front frame portion 30 in the seat width direction. That is, an end face of head 71 on the shank 72 side can be pressed against an outer end face of rising wall portion 10E, an outer end face of rising wall portion 20E and an outer end face of protrusion 30F, thereby allowing these outer end faces to be aligned flush with each other.

[First Variation of Second Embodiment]

Figure 19:
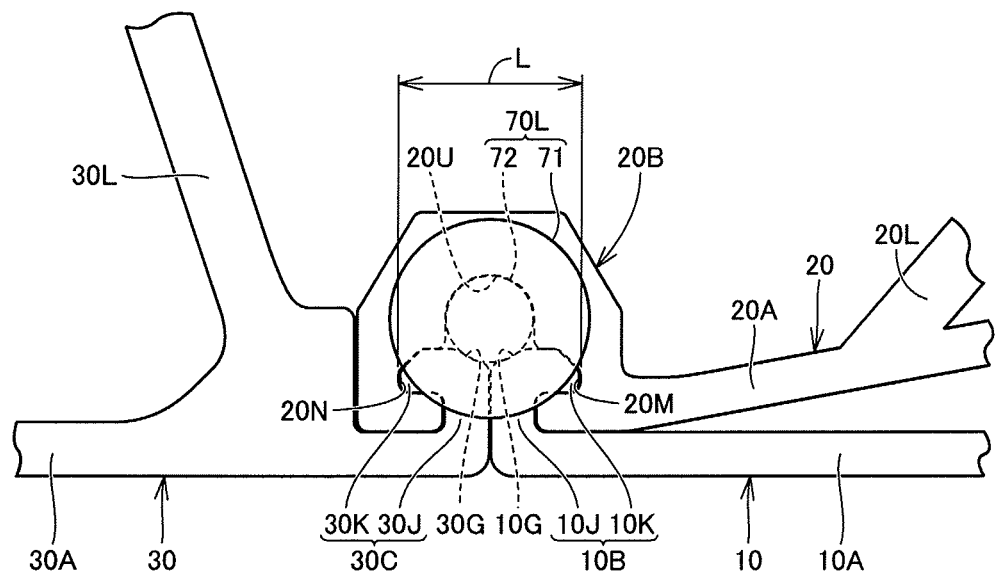
FIG. 19 is a side view showing a portion of the vehicle seat in a first variation of the second embodiment.

In the second embodiment described above, cushion panel 10 corresponds to the "first member," rear frame portion 20 corresponds to the "second member," and front frame portion 30 corresponds to the "third member." In an example shown in FIG. 19 (a first variation of the second embodiment), on the other hand, cushion panel 10 corresponds to the "first member," front frame portion 30 corresponds to the "second member," and rear frame portion 20 corresponds to the "third member."

As shown in FIG. 19, front end portion 10B of cushion panel 10 is provided with rising wall portion 10J and engaging pawl 10K (first engaging pawl). Rising wall portion 10J is provided between base portion 10A and engaging pawl 10K, and an obliquely upwardly and forwardly located surface of rising wall portion 10J constitutes pressing surface 10G as the first pressing surface (first pressed surface). Engaging pawl 10K is provided on the top of rising wall portion 10J and formed to face rearward.

Lower rear end portion 30C of front frame portion 30 is provided with rising wall portion 30J and engaging pawl 30K (second engaging pawl). Rising wall portion 30J is provided between lower surface portion 30A and engaging pawl 30K, and an obliquely upwardly and rearwardly located surface of rising wall portion 30J constitutes pressing surface 30G as the second pressing surface (second pressed surface). Engaging pawl 30K is provided on the top of rising wall portion 30J and formed to face forward.

Lower front end portion 20B of rear frame portion 20 has a concave shape with an open lower side, with concave portion 20M (first concave portion) and concave portion 20N (second concave portion) provided on the inner side of lower front end portion 20B. Concave portions 20M and 20N are formed to face each other.

Engaging pawl 10K (first engaging pawl) is disposed on the inner side of concave portion 20M (first concave portion), and engaging pawl 30K (second engaging pawl) is disposed on the inner side of concave portion 20N (second concave portion). A gap having a substantially cylindrical shape is formed between an inner surface 20U of lower front end portion 20B, pressing surface 10G of front end portion 10B, and pressing surface 30G of lower rear end portion 30C. Screw 70L is inserted into this gap from the outer side in the seat width direction.

When engaging pawl 10K is disposed on the inner side of concave portion 20M, engaging pawl 30K is disposed on the inner side of concave portion 20N, and screw 70L is disposed in the aforementioned gap, pressing surface 10G is pressed obliquely downward and rearward by shank 72. Biasing force generated by the pressing remains in an assembled state, causing an outer surface of engaging pawl 10K to be brought into pressure contact with an inner surface of concave portion 20M, thereby allowing engaging pawl 10K to engage with concave portion 20M with greater force. Similarly, pressing surface 30G is pressed obliquely downward and forward by shank 72. Biasing force generated by the pressing remains in an assembled state, causing an outer surface of engaging pawl 30K to be brought into pressure contact with an inner surface of concave portion 20N, thereby allowing engaging pawl 30K to engage with concave portion 20N with greater force. These mechanisms similarly apply to screw 70R. These members constituting the framework of the vehicle seat can be joined together without using a welding process.

[Second Variation of Second Embodiment]

Figure 20:
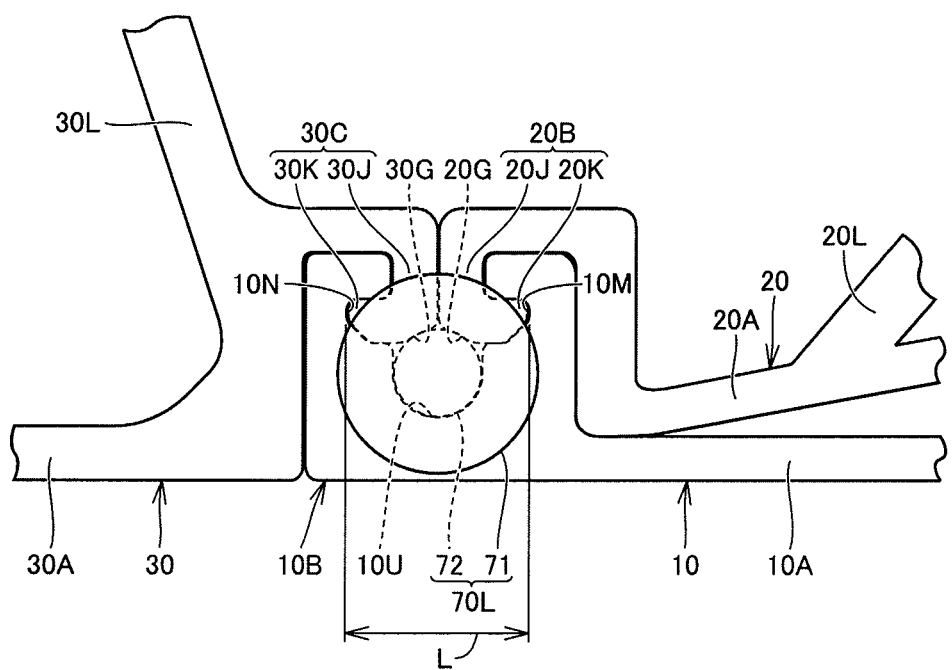
FIG. 20 is a side view showing a portion of the vehicle seat in a second variation of the second embodiment.

In an example shown in FIG. 20 (a second variation of the second embodiment), front frame portion 30 corresponds to the "first member," rear frame portion 20 corresponds to the "second member," and cushion panel 10 corresponds to the "third member."

As shown in FIG. 20, lower rear end portion 30C of front frame portion 30 is provided with rising wall portion 30J and engaging pawl 30K (first engaging pawl). Rising wall portion 30J is provided between lower surface portion 30A and engaging pawl 30K, and an obliquely downwardly and rearwardly located surface of rising wall portion 30J constitutes pressing surface 30G as the first pressing surface (first pressed surface). Engaging pawl 30K is provided on the bottom of rising wall portion 30J and formed to face forward.

Lower front end portion 20B of rear frame portion 20 is provided with rising wall portion 20J and engaging pawl 20K (second engaging pawl). Rising wall portion 20J is provided between lower surface portion 20A and engaging pawl 20K, and an obliquely downwardly and forwardly located surface of rising wall portion 20J constitutes pressing surface 20G as the second pressing surface (second pressed surface). Engaging pawl 20K is provided on the bottom of rising wall portion 20J and formed to face rearward.

Front end portion 10B of cushion panel 10 has a concave shape with an open upper side, with concave portion 10N (first concave portion) and concave portion 10M (second concave portion) provided on the inner side of front end portion 10B. Concave portions 10N and 10M are formed to face each other.

Engaging pawl 30K (first engaging pawl) is disposed on the inner side of concave portion 10N (first concave portion), and engaging pawl 20K (second engaging pawl) is disposed on the inner side of concave portion 10M (second concave portion). A gap having a substantially cylindrical shape is formed between an inner surface 10U of front end portion 10B, pressing surface 30G of lower rear end portion 30C, and pressing surface 20G of lower front end portion 20B. Screw 70L is inserted into this gap from the outer side in the seat width direction.

When engaging pawl 30K is disposed on the inner side of concave portion 10N, engaging pawl 20K is disposed on the inner side of concave portion 10M, and screw 70L is disposed in the aforementioned gap, pressing surface 30G is pressed obliquely upward and forward by shank 72. Biasing force generated by the pressing remains in an assembled state, causing the outer surface of engaging pawl 30K to be brought into pressure contact with an inner surface of concave portion 10N, thereby allowing engaging pawl 30K to engage with concave portion 10N with greater force. Similarly, pressing surface 20G is pressed obliquely upward and rearward by shank 72. Biasing force generated by the pressing remains in an assembled state, causing an outer surface of engaging pawl 20K to be brought into pressure contact with an inner surface of concave portion 10M, thereby allowing engaging pawl 20K to engage with concave portion 10M with greater force. These mechanisms similarly apply to screw 70R. These members constituting the framework of the vehicle seat can be joined together without using a welding process.

The following is a summary of the disclosure described above.

A vehicle seat disclosed in the present specification includes: a seat cushion and a seat back; and a seat frame constituting a framework of the seat cushion and the seat back, the seat frame having a first member provided with a first engaging pawl and a first pressing surface, a second member provided with a second engaging pawl and a second pressing surface, and a third member provided with a first concave portion and a second concave portion, in which the first engaging pawl is disposed on an inner side of the first concave portion, the second engaging pawl is disposed on an inner side of the second concave portion, and at least a portion of the first pressing surface and at least a portion of the second pressing surface press each other, causing the first engaging pawl to engage with the first concave portion, and the second engaging pawl to engage with the second concave portion.

In the vehicle seat described above, the first concave portion and the second concave portion may be formed to face each other.

In the vehicle seat described above, the third member may have a protrusion between the first concave portion and the second concave portion, and the protrusion may be disposed between the first pressing surface and the second pressing surface, and may press at least one of the first pressing surface and the second pressing surface.

The vehicle seat described above may further include an inserted member configured to be disposed so as to face the first pressing surface and the second pressing surface, in which at least the portion of the first pressing surface and at least the portion of the second pressing surface may press each other with the inserted member interposed therebetween.

In the vehicle seat described above, the inserted member may have a shank configured to be inserted between the first pressing surface and the second pressing surface, and a head configured to be provided on an outer side of the shank in a seat width direction, and to make contact with the first member, the second member and the third member from the outer side in the seat width direction, to define relative positions of the first member, the second member and the third member in the seat width direction.

In the vehicle seat described above, the first member may be a cushion panel disposed between a pair of side frames, with the first engaging pawl and the first pressing surface provided at a front end portion of the cushion panel, the second member may be a rear frame portion constituting the side frames, the rear frame portion having an upper front end portion and a lower front end portion, with the second engaging pawl and the second pressing surface provided at the lower front end portion, and the third member may be a front frame portion constituting the side frames, the front frame portion having an upper rear end portion and a lower rear end portion, with the first concave portion and the second concave portion provided at the lower rear end portion.

In the vehicle seat described above, the lower rear end portion of the third member may have a concave shape with an open lower side, and the first concave portion and the second concave portion may be formed on an inner side of this concave shape.

In the vehicle seat described above, the first concave portion may be provided forward relative to the second concave portion, and the first member as the cushion panel may be disposed below the second member as the rear frame portion.

In the vehicle seat described above, each of the first member, the second member and the third member may be formed by being cut from an extrusion material made of an aluminum alloy or a magnesium alloy having a constant cross sectional shape in a direction orthogonal to the seat width direction.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle seat comprising:
   a seat cushion and a seat back; and
   a seat frame constituting a framework of the seat cushion and the seat back, the seat frame having
      a first member provided with a first engaging pawl and a first pressing surface,
      a second member provided with a second engaging pawl and a second pressing surface, and
      a third member provided with a first concave portion and a second concave portion, wherein
   the first engaging pawl is disposed on an inner side of the first concave portion, the second engaging pawl is disposed on an inner side of the second concave portion, and at least a portion of the first pressing surface and at least a portion of the second pressing surface pressure contact each other to generate a reaction force such that the first engaging pawl engages the first concave portion, and the second engaging pawl engages the second concave portion to maintain the seat frame in an assembled state.

2. The vehicle seat according to claim 1, wherein the first concave portion and the second concave portion face each other.

3. The vehicle seat according to claim 2, wherein the third member has a protrusion between the first concave portion and the second concave portion, and the protrusion is disposed between the first pressing surface and the second pressing surface, and presses at least one of the first pressing surface and the second pressing surface.

4. The vehicle seat according to claim 1, further comprising an inserted member configured to be disposed so as to face the first pressing surface and the second pressing surface, wherein
   at least the portion of the first pressing surface and at least the portion of the second pressing surface press each other with the inserted member interposed therebetween.

5. The vehicle seat according to claim 4, wherein the inserted member has
   a shank configured to be inserted between the first pressing surface and the second pressing surface, and
   a head configured to be provided on an outer side of the shank in a seat width direction, and to make contact with the first member, the second member and the third member from the outer side in the seat width direction, to define relative positions of the first member, the second member and the third member in the seat width direction.

6. The vehicle seat according to claim 1, wherein the first member is a cushion panel disposed between a pair of side frames, with the first engaging pawl and the first pressing surface provided at a front end portion of the cushion panel,
   the second member is a rear frame portion constituting the side frames, the rear frame portion having an upper front end portion and a lower front end portion, with the second engaging pawl and the second pressing surface provided at the lower front end portion, and
   the third member is a front frame portion constituting the side frames, the front frame portion having an upper rear end portion and a lower rear end portion, with the first concave portion and the second concave portion provided at the lower rear end portion.

7. The vehicle seat according to claim 6, wherein the lower rear end portion of the third member has a concave shape with an open lower side, and the first concave portion and the second concave portion are formed on an inner side of this concave shape.

8. The vehicle seat according to claim 7, wherein the first concave portion is provided forward relative to the second concave portion, and
   the first member as the cushion panel is disposed below the second member as the rear frame portion.

9. The vehicle seat according to claim 1, wherein each of the first member, the second member and the third member is an extruded aluminum alloy, or a magnesium alloy, having a constant cross sectional shape in a direction orthogonal to the seat width direction.

10. The vehicle seat according to claim 1, wherein the portion of the first pressing surface and the portion of the second pressing surface directly press each.

* * * * *